US011153347B2

(12) United States Patent
Savalle et al.

(10) Patent No.: US 11,153,347 B2
(45) Date of Patent: Oct. 19, 2021

(54) PRESERVING PRIVACY IN EXPORTING DEVICE CLASSIFICATION RULES FROM ON-PREMISE SYSTEMS

(71) Applicant: Cisco Technology, Inc., San Jose, CA (US)

(72) Inventors: Pierre-Andre Savalle, Rueil-Malmaison (FR); Jean-Philippe Vasseur, Saint Martin d'uriage (FR); Grégory Mermoud, Veyras VS (CH)

(73) Assignee: Cisco Technology, Inc., San Jose, CA (US)

( * ) Notice: Subject to any disclaimer, the term of this patent is extended or adjusted under 35 U.S.C. 154(b) by 316 days.

(21) Appl. No.: 16/424,912

(22) Filed: May 29, 2019

(65) Prior Publication Data
US 2020/0382553 A1    Dec. 3, 2020

(51) Int. Cl.
*H04L 29/06* (2006.01)
*H04L 29/08* (2006.01)
*G06N 20/00* (2019.01)
*G06N 5/02* (2006.01)

(52) U.S. Cl.
CPC ............ *H04L 63/20* (2013.01); *G06N 5/025* (2013.01); *G06N 20/00* (2019.01); *H04L 67/10* (2013.01)

(58) Field of Classification Search
CPC ......... H04L 63/20; H04L 67/10; H04L 63/04; H04L 67/303; H04L 41/16; G06N 20/00; G06N 5/025; G06N 5/04; H04W 12/02
See application file for complete search history.

(56) References Cited

U.S. PATENT DOCUMENTS

| | | | | |
|---|---|---|---|---|
| 10,817,750 | B2* | 10/2020 | Hazard | G06K 9/6257 |
| 10,873,456 | B1* | 12/2020 | Dods | G06N 3/0445 |
| 2018/0173894 | A1* | 6/2018 | Boehler | G06F 21/6254 |
| 2018/0181878 | A1* | 6/2018 | Kasiviswanathan | G06F 21/6245 |
| 2019/0073608 | A1* | 3/2019 | Veeningen | G06F 16/285 |
| 2020/0082270 | A1* | 3/2020 | Gu | G06F 21/602 |
| 2020/0382281 | A1* | 12/2020 | Fletcher | H04L 9/3239 |
| 2021/0064760 | A1* | 3/2021 | Sharma | G06N 5/04 |

OTHER PUBLICATIONS

U.S. Appl. No. 15/996,645, Unpublished (filed Jun. 4, 2018), Cisco Technology, Inc.
"Differential privacy", online: https://en.wikipedia.org/wiki/Differential_privacy, dated May 12, 2019, printed May 20, 2019, 7 pages, Wikimedia Foundation, Inc.
Holohan, Naoise, "Mathematical Foundations of Differential Privacy", Trinity College Dublin, Sep. 2016, 184 pages.

* cited by examiner

*Primary Examiner* — Michael Won
(74) *Attorney, Agent, or Firm* — Behmke Innovation Group LLC; Kenneth J. Heywood; Jonathon P. Western

(57) ABSTRACT

In one embodiment, a device in a network obtains data indicative of a device classification rule, a device type label associated with the rule, and a set of positive and negative feature vectors used to create the rule. The device replaces similar feature vectors in the set of positive and negative feature vectors with a single feature vector, to form a reduced set of feature vectors. The device applies differential privacy to the reduced set of feature vectors. The device sends a digest to a cloud service. The digest comprises the device classification rule, the device type label, and the reduced set of feature vectors to which differential privacy was applied. The service uses the digest to train a machine learning-based device classifier.

20 Claims, 9 Drawing Sheets

PRESERVING PRIVACY IN EXPORTING DEVICE CLASSIFICATION RULES FROM ON-PREMISE SYSTEMS

TECHNICAL FIELD

The present disclosure relates generally to computer networks, and, more particularly, to preserving privacy in exporting device classification rules from on-premise systems.

BACKGROUND

An emerging area of interest in the field of computer networking is the "Internet of Things" (IoT), which may be used by those in the art to refer to uniquely identifiable objects/things and their virtual representations in a network-based architecture. In particular, the next frontier in the evolution of the Internet is the ability to connect more than just computers and communications devices, but rather the ability to connect "objects" in general, such as lights, appliances, vehicles, window shades and blinds, doors, locks, etc.

As more non-traditional devices join the IoT, networks may eventually evolve from a bring-your-own-device (BYOD) model to a model that enables bring-your-own-thing (BYOT), bring-your-own-interface (BYOI), and/or bring-your-own-service (BYOS) paradigms. In other words, as the IoT grows, the number of available services, etc., will also grow considerably. For example, a single person in the future may transport sensor-equipped clothing, other portable electronic devices (e.g., cell phones, etc.), cameras, pedometers, or the like, into an enterprise environment, each of which may attempt to access the wealth of new IoT services that are available on the network.

From a networking perspective, the network can automatically configure access control policies, other security policies, and the like, if the device type of a particular device is known to the network. For example, the network may limit a particular type of sensor to only communicating with its supervisory device. Typically, this classification is made by observing the behavior of the device during a short period of time after joining the network (e.g., the first minute) and applying a device classification rule to the observed behavior.

Device classification rules are often maintained on-premise, meaning that classification rules are likely to differ between network deployments. A key observation herein is that sharing device classification rules across network deployments can: 1.) help to ensure rule accuracy by cross-validating rules from different deployments and 2.) facilitate the propagation of rules to other networks with similar devices. Despite these benefits, privacy, security, and resource consumption remain major hurdles to sharing device classification rules across network deployments.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
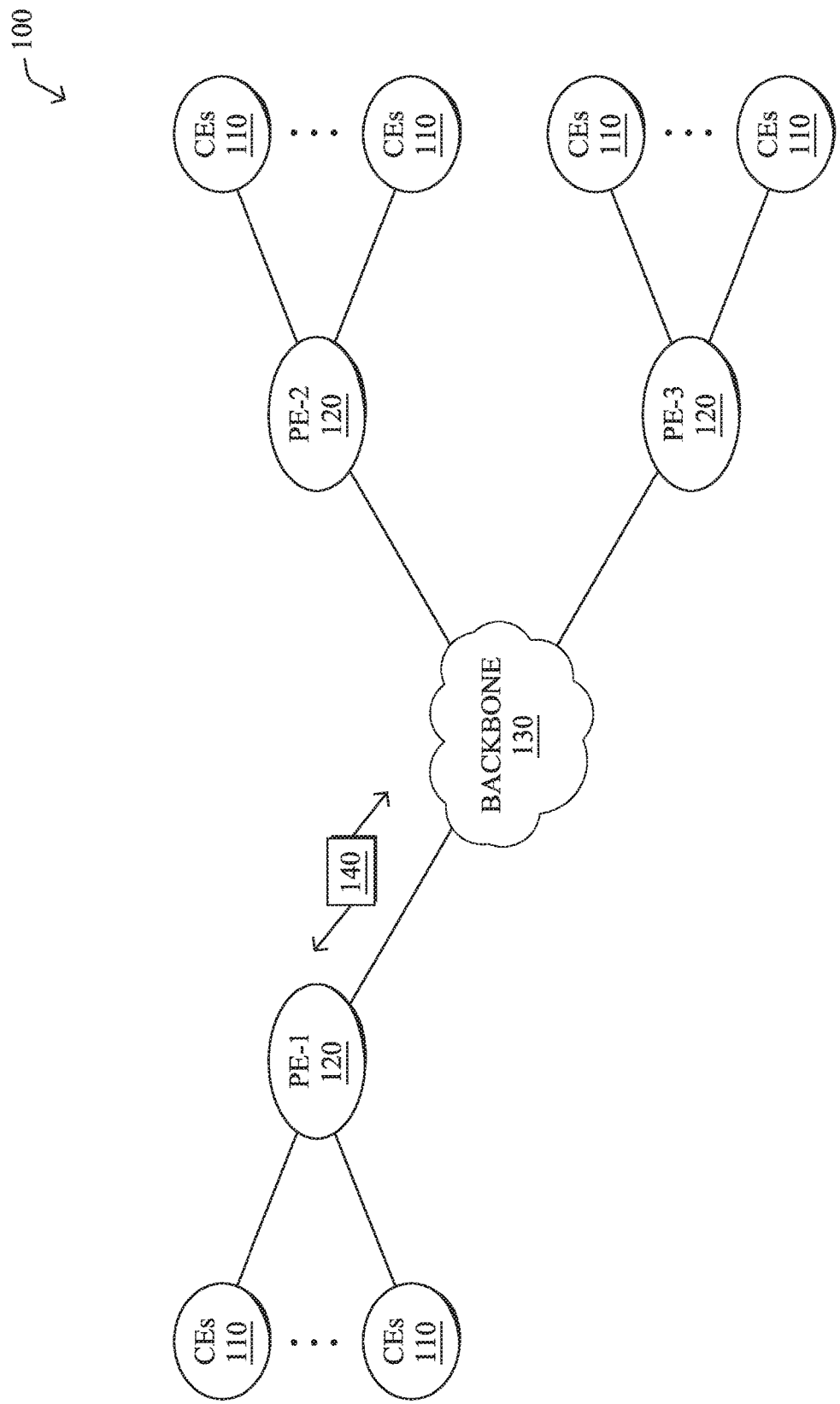
FIGS. 1A-1B illustrate an example communication network.

According to one or more embodiments of the disclosure, a device in a network obtains data indicative of a device classification rule, a device type label associated with the rule, and a set of positive and negative feature vectors used to create the rule. The device replaces similar feature vectors in the set of positive and negative feature vectors with a single feature vector, to form a reduced set of feature vectors. The device applies differential privacy to the reduced set of feature vectors. The device sends a digest to a cloud service. The digest comprises the device classification rule, the device type label, and the reduced set of feature vectors to which differential privacy was applied. The service uses the digest to train a machine learning-based device classifier.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may further be interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications)

temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless networks. That is, in addition to one or more sensors, each sensor device (node) in a sensor network may generally be equipped with a radio transceiver or other communication port, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN, thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different service providers), with potentially a backup link (e.g., a 3G/4G/5G/LTE connection). A site of type B may itself be of different types:

2a.) Site Type B1: a site connected to the network using two MPLS VPN links (e.g., from different service providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
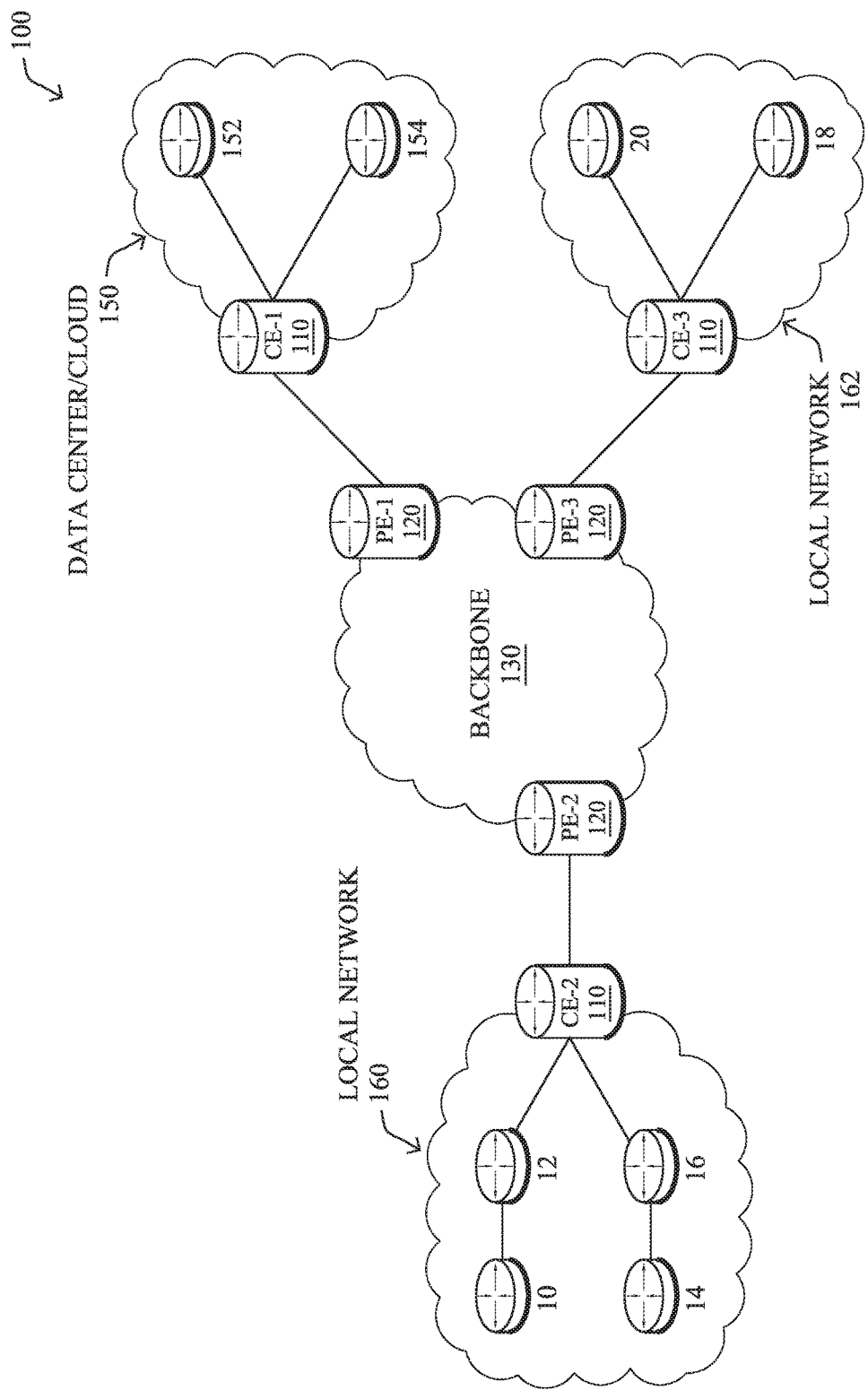

FIG. 1B illustrates an example of network 100 in greater detail, according to various embodiments. As shown, network backbone 130 may provide connectivity between devices located in different geographical areas and/or different types of local networks. For example, network 100 may comprise local networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

The techniques herein may also be applied to other network topologies and configurations. For example, the techniques herein may be applied to peering points with high-speed links, data centers, etc. Further, in various embodiments, network 100 may include one or more mesh networks, such as an Internet of Things network. Loosely, the term "Internet of Things" or "IoT" refers to uniquely identifiable objects/things and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless networks, etc., are often on what is referred to as Low-Power and Lossy Networks (LLNs), which are a class of network in which both the routers and their interconnect are constrained. In particular, LLN routers typically operate with highly constrained resources, e.g., processing power, memory, and/or energy (battery), and their interconnections are characterized by, illustratively, high loss rates, low data rates, and/or instability. LLNs are comprised of anything from a few dozen to thousands or even millions of LLN routers, and support point-to-point traffic (e.g., between devices inside the LLN), point-to-multipoint traffic (e.g., from a central control point such at the root node to a subset of devices inside the LLN), and multipoint-to-point traffic (e.g., from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

Figure 2:
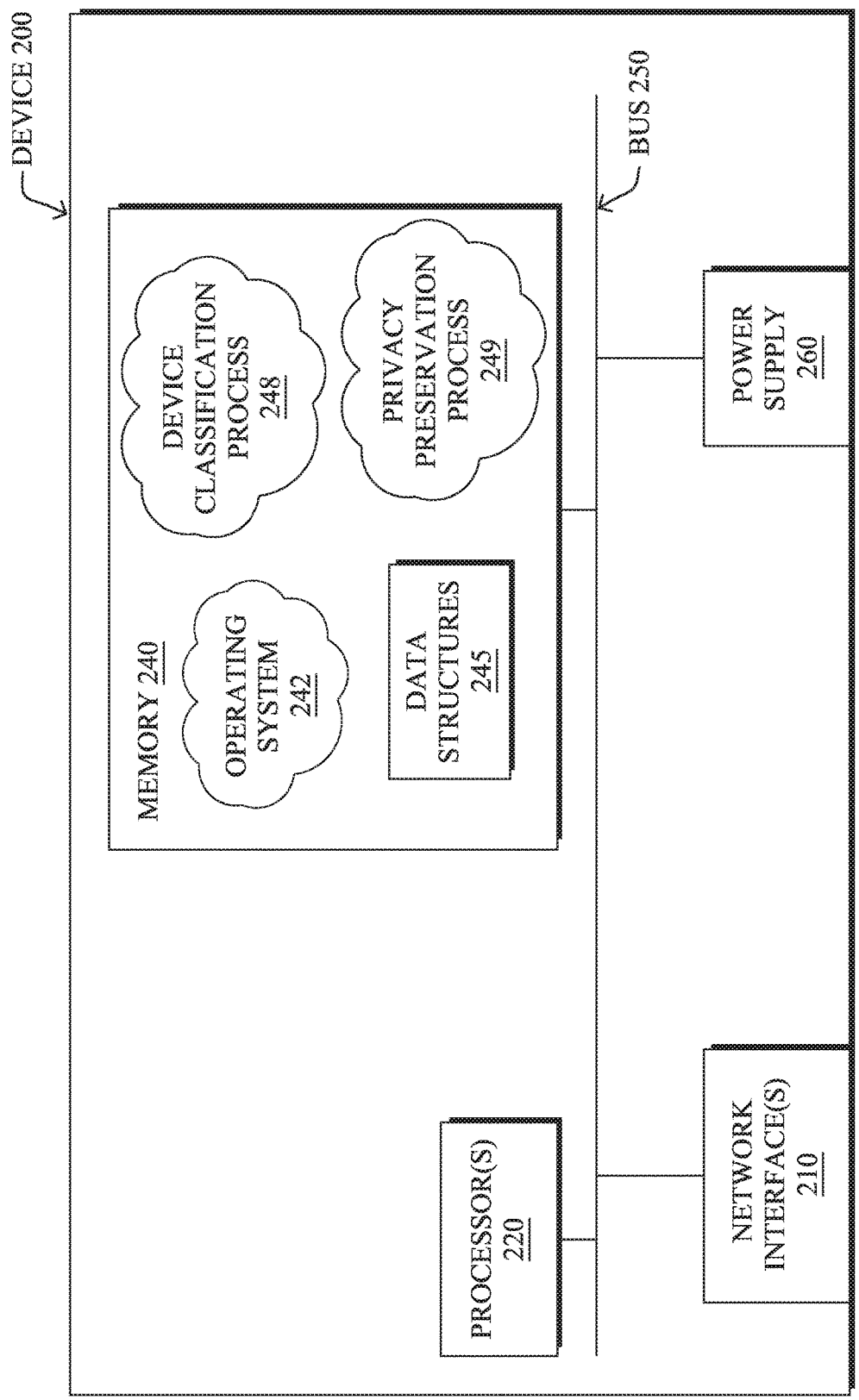
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a device classification process 248 and/or a privacy preservation process 249, as detailed below.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, device classification process 248 may execute one or more machine learning-based classifiers to classify a device in a network, based on its corresponding network traffic. In one embodiment, device classification process 248 may assess captured telemetry data regarding one or more traffic flows involving the device, to determine the device type associated with the device. In further embodiments, device classification process 248 may classify the operating system of the device, based on its captured traffic telemetry data.

Device classification process 248 may employ any number of machine learning techniques, to classify the gathered telemetry data and apply a device type label to a device associated with the traffic. In general, machine learning is concerned with the design and the development of techniques that receive empirical data as input (e.g., telemetry data regarding traffic in the network) and recognize complex patterns in the input data. For example, some machine learning techniques use an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function is a function of the number of misclassified points. The learning process then operates by adjusting the parameters a,b,c such that the number of misclassified points is minimal. After this optimization/learning phase, device classification process 248 can use the model M to classify new data points, such as information regarding new traffic flows in the network. Often, M is a statistical model, and the cost function is inversely proportional to the likelihood of M, given the input data.

In various embodiments, device classification process 248 may employ one or more supervised, unsupervised, or semi-supervised machine learning models. Generally, supervised learning entails the use of a training set of data, as noted above, that is used to train the model to apply labels to the input data. For example, the training data may include sample telemetry data that is labeled as "iPhone 6," or "iOS 10.2." On the other end of the spectrum are unsupervised techniques that do not require a training set of labels. Notably, while a supervised learning model may look for previously seen patterns that have been labeled as such, an unsupervised model may attempt to analyze the data without applying a label to it. For example, supervised learning can be used to cluster devices that behave similarly to one another, based on their captured telemetry data. Semi-supervised learning models take a middle ground approach that uses a greatly reduced set of labeled training data.

Example machine learning techniques that device classification process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) artificial neural networks (ANNs) (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, the false positives of the model may refer to the number of traffic flows that are incorrectly classified as associated with a particular device type (e.g., make and/or model number, operating system, etc.). Conversely, the false negatives of the model may refer to the number of traffic flows that the model incorrectly classifies as belonging to a certain device type. True negatives and positives may refer to the number of traffic flows that the model correctly classifies as not being of a certain class or being of a certain class, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

In some cases, device classification process 248 may assess the captured telemetry data on a per-flow basis. In other embodiments, device classification process 248 may assess telemetry data for a plurality of traffic flows based on any number of different conditions. For example, traffic flows may be grouped based on their sources, destinations, temporal characteristics (e.g., flows that occur around the same time or within the same time window, etc.), combinations thereof, or based on any other set of flow characteristics.

Figure 3:
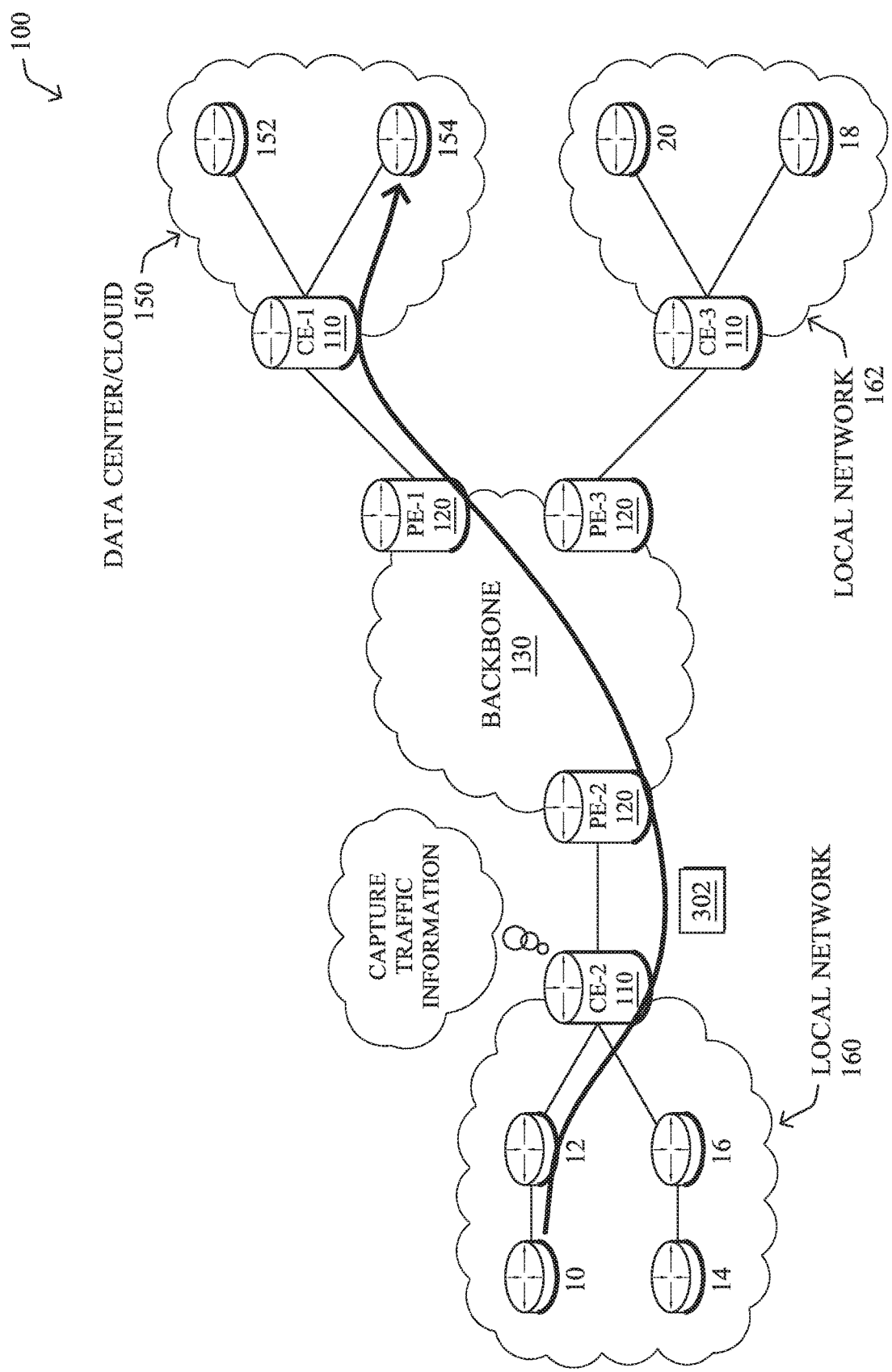
FIG. 3 illustrates an example of the capture of traffic telemetry data.

As shown in FIG. 3, various mechanisms can be leveraged to capture information about traffic in a network, such as telemetry data regarding a traffic flow. For example, consider the case in which client node 10 initiates a traffic flow with remote server 154 that includes any number of packets 302. Any number of networking devices along the path of the flow may analyze and assess packet 302, to capture telemetry data regarding the traffic flow. For example, as shown, consider the case of edge router CE-2 through which the traffic between node 10 and server 154 flows.

In some embodiments, a networking device may analyze packet headers, to capture telemetry data about the traffic flow. For example, router CE-2 may capture the source address and/or port of host node 10, the destination address and/or port of server 154, the protocol(s) used by packet 302, the hostname of server 154, and/or other header information by analyzing the header of a packet 302. Example features in the captured telemetry data may include, but are not limited to, Transport Layer Security (TLS) information (e.g., from a TLS handshake), such as the ciphersuite offered, User Agent information, destination hostname, TLS extensions, etc., HTTP information (e.g., URI, etc.), Domain Name System (DNS) information, ApplicationID, virtual LAN (VLAN) ID, or any other data features that can be extracted from the observed traffic flow(s). Further information, if available could also include process hash information from the process on host node 10 that participates in the traffic flow.

In further embodiments, the device may also assess the payload of the packet to capture information about the traffic flow. For example, router CE-2 or another device may perform deep packet inspection (DPI) on one or more of packets 302, to assess the contents of the packet. Doing so may, for example, yield additional information that can be used to determine the application associated with the traffic flow (e.g., packets 302 were sent by a web browser of node 10, packets 302 were sent by a videoconferencing application, etc.).

The networking device that captures the flow telemetry data may also compute any number of statistics or metrics regarding the traffic flow. For example, CE-2 may determine the start time, end time, duration, packet size(s), the distribution of bytes within a flow, etc., associated with the traffic flow by observing packets 302.

As noted above, with the proliferation of IoT devices and the bring-your-own-device (BYOD) approach, it is very difficult for an administrator to provide detailed information about each device connected to the network, such as its device type (e.g., printer, iPhone, tablet, iOS 10 device, etc.). Because of the dynamic nature of modern networks, this type of information is not static and cannot be handled manually. However, such detailed information may be needed for proper assessment of security incidents involving a particular device, to apply a network access policy to the device, for purposes of traffic shaping of traffic involving the device, and other network operations.

Figure 4:
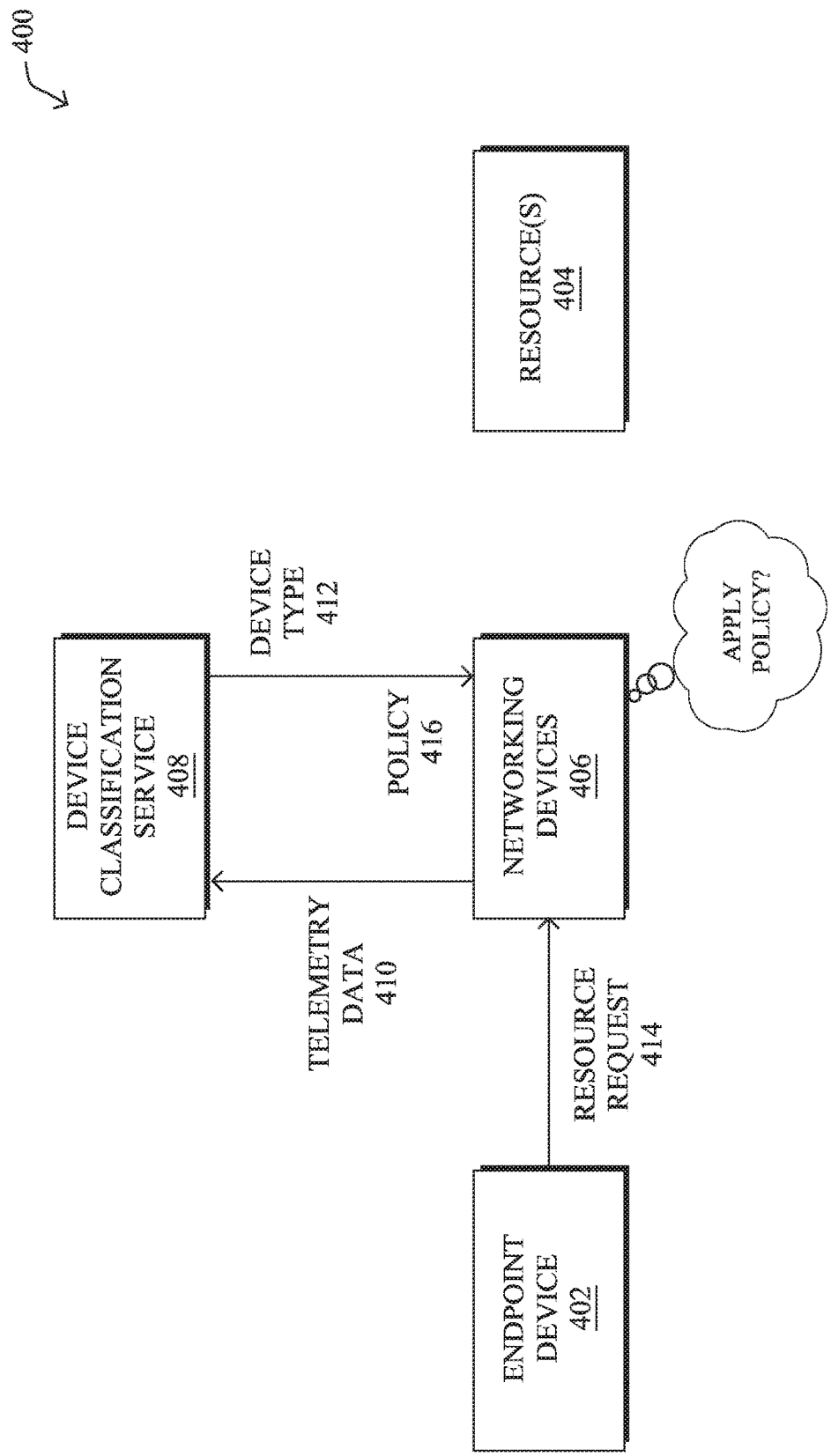
FIG. 4 illustrates an example of a device classification service in a network.

FIG. 4 illustrates an example of a device classification service in a network, in various embodiments. As shown, network 400 may generally include an endpoint device 402 (e.g., a user device, a sensor, an actuator, etc.), any number of resources 404, and any number of networking devices 406 that are configured to provide connectivity between endpoint device 402 and resource(s) 404. For example, networking devices 406 may include access points, wireless LAN controllers (WLCs), switches, routers, security devices (e.g., firewalls, etc.), access points (APs), and the like. Network resources 404 may include cloud-based services, specific servers or other endpoints, webpages, or any other resource with which endpoint device 402 could communicate.

Also as shown in FIG. 4 is a device classification service 408 that may be hosted on one or more of networking devices 406 or be in communication therewith. Service 408 may, for example, be provided through the execution of device classification process 248 and/or privacy preservation process 249, described above. In general, device classification service 408 is configured to take as input telemetry data 410 captured by networking device 406 regarding network traffic associated with endpoint device 402 and, based on the captured telemetry, identify the device type 412 of endpoint device 402. For example, device type 412 may indicate the operating system (e.g., iOS, Android, etc.), manufacturer (e.g., Apple, Samsung, etc.), make (e.g., iPhone, etc.), model/version (e.g., 5s, 6, 7, etc.), function (e.g., thermostat, temperature sensor, etc.), or any other information that can be used to categorize endpoint device 402.

Note that the classification of endpoint device 402 by device classification service 408 can also, in some embodiments, be of varying specificity, depending on the telemetry data 410 available to service 408 and/or its degree of confidence in a particular classification. For example, device classification service 408 may determine, with a high degree of confidence, that endpoint device 402 is an Apple iPhone, but may or may not be able to determine whether device 402 is an iPhone 5s or an iPhone 6. Accordingly, in some embodiments, service 408 may also return the confidence values for the classification label(s) in device type 412 to networking device 406.

The labeling of endpoint device 402 with a device type 412 by device classification service 408 may initiate enforcement of one or more network policies by networking device 406 with respect to endpoint device 402. Such network policies may include, but are not limited to, security policies, network traffic or quality of service (QoS) policies, access polices, and the like. For example, as shown, assume that endpoint device 402 sends out a resource request 414 for a particular one of resources 404. In turn, networking devices 406 may determine whether to allow or block resource request 414 from reaching its target resource 404, based on the policy 416 associated with the determined device type 412 of endpoint device 402. For example, if endpoint device 402 is determined to be a smart thermostat, it may be prevented from accessing certain online resources, such as an email service. Similarly, if endpoint device 402 is determined to be a safety-related sensor, a traffic or QoS policy associated with device type 412 may cause networking devices 406 to assign a higher priority to traffic from endpoint device 402.

In general, device classification (also known as "device profiling") to identify the device type of a device under scrutiny has traditionally used static rules and heuristics for the determination. In further embodiments, the device classification can be achieved by applying a trained machine learning-based classifier to the captured telemetry data for an endpoint device. Such telemetry can also take the form of information captured through active and/or passive probing of endpoint devices, to assign a device type and corresponding host profile to a device. Notably, this probing may entail sending any or all of the following probes:

DHCP probes with helper addresses

SPAN probes, to get messages in INIT-REBOOT and SELECTING states, use of ARP cache for IP/MAC binding, etc.

Netflow probes

HTTP probes to obtain information such as the OS of the device, Web browser information, etc.

RADIUS probes

SNMP to retrieve MIB object or receives traps

DNS probes to get the Fully Qualified Domain Name (FQDN)

etc.

A device classification service may even trigger active scanning of the network and SNMP scanning when the default community string is set to public. This can be done, for example, to retrieve the MAC address of the device or other types of information. Such a variety to probes allows for the gathering of a rich set of information that can be used for device profiling. A degree of confidence can also be assigned to any such device type classifications. Note also that the device profiling can be performed at multiple points in the network, such as by wireless LAN controllers (WLCs) in addition to, or in lieu of, a centralized service.

Figure 5:
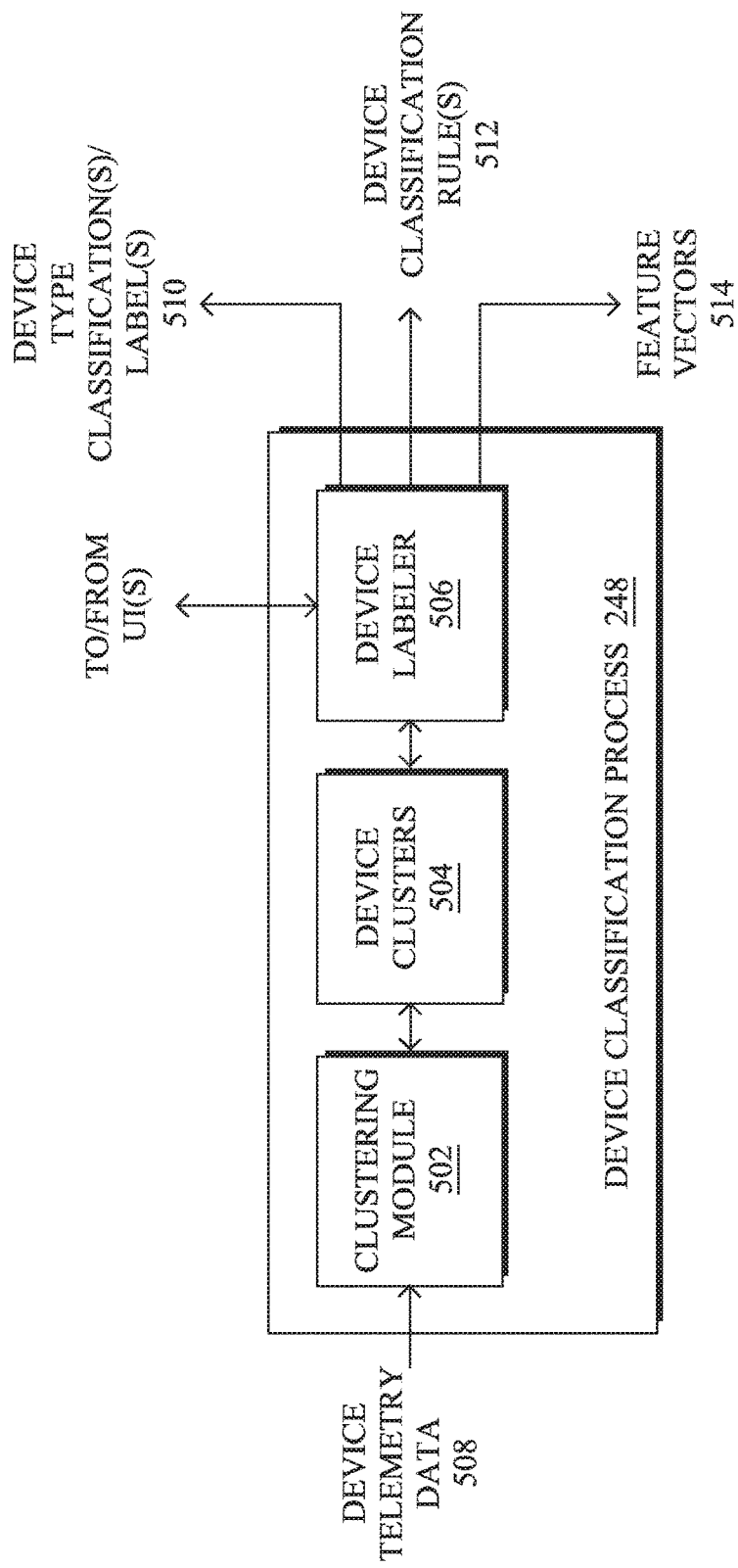
FIG. 5 illustrates an example architecture for a device classification process.

FIG. 5 illustrates an example architecture 500 for device classification process 248, according to various embodiments. As shown, device classification process 248 may include any or all of the following components: clustering module 502, device clusters 504, and/or a device labeler 506, to provide a device classification service to one or more networks. These components 502-506 may be implemented in a distributed manner or implemented on a single device. In addition, some or all of components 502-506 may be implemented as part of a monitored network (e.g., at the network edge) or part of a cloud-based device classification service. For example, in some implementations, a cloud-based device classification service may perform centralized rule generation for any number of networks that perform the classifications locally. The functionalities of the components of architecture 500 may also be combined, omitted, or implemented as part of other processes, as desired.

As shown, device classification process 248 may receive device telemetry data 508 regarding any number of devices undergoing device type classification. Such device telemetry data 508 may include, for example, the MAC addresses of the devices, traffic features captured from the devices' traffic (e.g., which protocols were used, source or destination information, etc.), timing information (e.g., when the devices communicate, sleep, etc.), and/or any other information regarding the devices that can be used to infer their device types. For example, device telemetry data 508 may take the form of a feature vector in which each dimension represents the presence or absence of a certain protocol in the traffic of the device such as, but not limited to, IPv6, IPv4, IGMPv3, IGMPv2, ICMPv6, ICMP, HTTP/XML, HTTP, etc.

In turn, device classification process 248 may output a device type classification/label 510 for a device under scrutiny, thereby allowing the receiving entity to apply network policies to the device, based on its device type classification (s)/label(s) 510. For example, one such network policy may cause a networking device to prevent an MRI machine from accessing the Internet or another resource via the network.

In various embodiments, the components 502-506 of device classification process 248 may leverage active learning, to assign device type classification(s)/label(s) 510 to the devices under scrutiny. To do so, clustering module 502 may assign the devices under scrutiny to device clusters 504, based on their telemetry data 508. For example, a device cluster 504 may include those devices that exhibit the same or similar traffic or other behavioral features. If a device type is then associated with a device cluster 504, device labeler 506 may apply that type to a device as device type classification 510. In cases in which device labeler 506 is unable to classify the cluster 504 with sufficient confidence, it may send a label request to a user interface (UI), seeking active labeling of that cluster. In other words, device classification process 248 may be configured to leverage active learning, to learn the labels of unknown devices over time. Note also that the pool of device telemetry data 508 may be from any number of networks and that device labeler 506 may seek labels for a device cluster 504 from any number of experts across any number of networks, as well. Once the cluster is labeled by an expert, device labeler 506 can then apply that label to any other devices that fall within that cluster, as well.

More formally, let $D=\{D_1, D_2, \ldots, D_N\}$ denote the set of devices seen on the one or more networks under analysis by device classification process 248, each of which is identified by its MAC address or another unique identifier. For every device $D_i$ at time t, clustering module 502 may construct a feature vector $X_{i,t}$ from the telemetry data 508 for the device. Clustering module 502 may then apply a clustering algorithm, such as DB-scan, k-means, k-medoids, etc., to create a set of device clusters 504. Let $C_t=\{C_{1,t}, \ldots, C_{K,t}\}$ denote these cluster, where $C_{j,t}$ is the $j^{th}$ set of devices clustered together at time t. As would be appreciated, the number of clusters K is typically smaller, or at most equal, to the number of points N, and the collection of clusters C defines a partition of the set of devices D. In doing so, each device represented in a device cluster 504 may exhibit similar behaviors as those of the other devices in its cluster.

Clustering module 502 may perform the device clustering periodically at a relatively high frequency (e.g., hourly) or at a lower frequency (e.g., weekly). Clustering module 502 can also produce subsequent clustering either by performing new clustering from scratch or by leveraging warm-starting techniques whereby $C_{t+1}$ is obtained by running the algorithm on data corresponding to that time point, but using an initialization based on $C_t$. Whether clustering module 502 uses warm-starting can have a large impact on the 'trajectory' of the clustering and is an important design consideration.

In various embodiments, device classification process 248 may also reclassify a device periodically, at a predefined time, or in response to a request to do so. For example, as the device under scrutiny uses the network, additional device telemetry data 508 can be captured. Generally speaking, the more telemetry data regarding the behavior of the device, the greater the accuracy of the resulting device type classification/label 510. Indeed, there may be slight behavioral differences between devices of different types, leading device classification process 248 to misclassify the device, initially, but correct this misclassification later on in time, as more information about the device becomes available.

According to various embodiments, device labeler 506 may also be configured to generate a device classification rule 512 for a given device cluster 504, based on its associated telemetry data 508, represented as positive and negative feature vectors 514, and the device type labels obtained from experts through active learning. For example, device labeler 506 may aggregate the labels obtained from the experts, to form a finalized device type classification label 510 for the device cluster 504, using any number of conditions (e.g., whether a threshold number of the labels agree, the majority of labels, etc.). In turn, device labeler 506 may associate this label with the telemetry data 508 representative of the device cluster 504, such as the centroid of the cluster, etc.

By generating a device classification rule 512, device labeler 506 can then use this rule to quickly assess the telemetry data for new devices on the network(s). In addition, device labeler 506 can also deploy device classification rule 512 to any number of Identity Service Engines (ISEs) and/or device classification services in the network(s), to perform the device classifications locally. This allows every new device appearing on the network and matching device classification rule 512 to be identified with the corresponding device type.

In practice, device classification rules 512 can be specified manually and/or automatically generated by device classification process 248. This leads to the very real possibility of at least some device classification rules 512 conflicting. For example, a manually-defined rule in a network under scrutiny may conflict with another rule that was automatically generated, other manually-defined rules in the network or other networks, etc.

For purposes of illustration, a device classification rule 512 may take the form of a pair (R,L) where R is a logical statement whose free variables are device attributes that specify whether the device type label L should be applied to a given device (e.g., if the attributes of the device satisfy R). Typically, the label L is a structured object of the form {manufacturer, hardware, software}, for instance, {Apple, iPhone 8, iOS 12.1.23}. In practice, R can be thought of as a low-dimensional manifold in the N-dimensional space spawned by all N attributes that a given device can have, such as its organizationally unique identifier (OUI), HTTP user agent, DHCP parameters, application usages, etc.

As noted above, active labeling represents one potential approach to device type classification whereby clustering is used to discover groups of similarly behaving devices/clients in a network that can be labeled, accordingly. This can be used in place of manual labeling workflows or not labeling the clients at all, resulting in a lot of unknown devices in the network and the inability to apply fine-grained security and access policies.

In many cases, active labeling can be performed fully on-premise (e.g., in the local network) and does not require any access to cloud services or to the Internet. However, the full power of labeling is unlocked when labels provided by an expert can be both checked against similar labels from other experts and shared with those that have similar devices in their networks. Such shared and crowd-sourcing mechanisms have the potential to increase the overall accuracy and detection rates of device classification systems, significantly. Indeed, sharing device classification rules with a cloud service can help to 1.) ensure rule accuracy by cross-validating rules from different network deployments and 2.) facilitate the propagation of rules to other networks with similar devices. Despite these benefits, privacy, security, and resource consumption remain major hurdles to sharing device classification rules across network deployments.

More specifically, a significant number of network administrators oppose any sort of connection to the cloud and some may even have fully air-gapped network, where there is zero physical connectivity to the Internet. Some of the concerns are security, but also privacy and avoiding the sharing of any proprietary information. In further cases, some networks are also bandwidth constrained such that sending too much network data to the cloud is unfeasible. Even with those constraints, these networks may benefit from a form of crowd-sourcing, especially if this allows for identifying inconsistencies in their rules.

While it is conceivable that an offline dump of the device classification rules learned through on-premise labeling could be leveraged for analysis by a cloud service, doing so also has significant limitations. First, the cloud service would only receive a classification rule without any additional context. This makes it difficult to do anything else than trust the rule and the labeling done by the local expert(s), taking those at face value. In particular, this makes it difficult to incorporate the label into a general, multi-class machine learning classifier learning process, since there are no feature vectors to use, only a label and a rule. Second, this does not address the issue of networks for which sending a large amount of data to the cloud is unfeasible.

Preserving Privacy in Exporting Device Classification Rules from On-Premise Systems The techniques herein introduce a method whereby device type labels and device classification rules learned using on-premise active labeling, or other labeling mechanisms, can be shared through a small offline dump, without leaking any sensitive information and with differential privacy guarantees. In some aspects, a cloud service could use the anonymized digests from the various on-premise device classification services, in combination with full datasets from certain networks, to jointly train large multi-class machine learning models in a global and consistent fashion.

Specifically, a device in a network obtains data indicative of a device classification rule, a device type label associated with the rule, and a set of positive and negative feature vectors used to create the rule. The device replaces similar feature vectors in the set of positive and negative feature vectors with a single feature vector, to form a reduced set of feature vectors. The device applies differential privacy to the reduced set of feature vectors. The device sends a digest to a cloud service. The digest comprises the device classification rule, the device type label, and the reduced set of feature vectors to which differential privacy was applied. The service uses the digest to train a machine learning-based device classifier.

Illustratively, the techniques described herein may be performed by hardware, software, and/or firmware, such as in accordance with the device classification process 248 and the privacy preservation process 249, which may include computer executable instructions executed by the processor 220 (or independent processor of interfaces 210) to perform functions relating to the techniques described herein.

Figure 6:
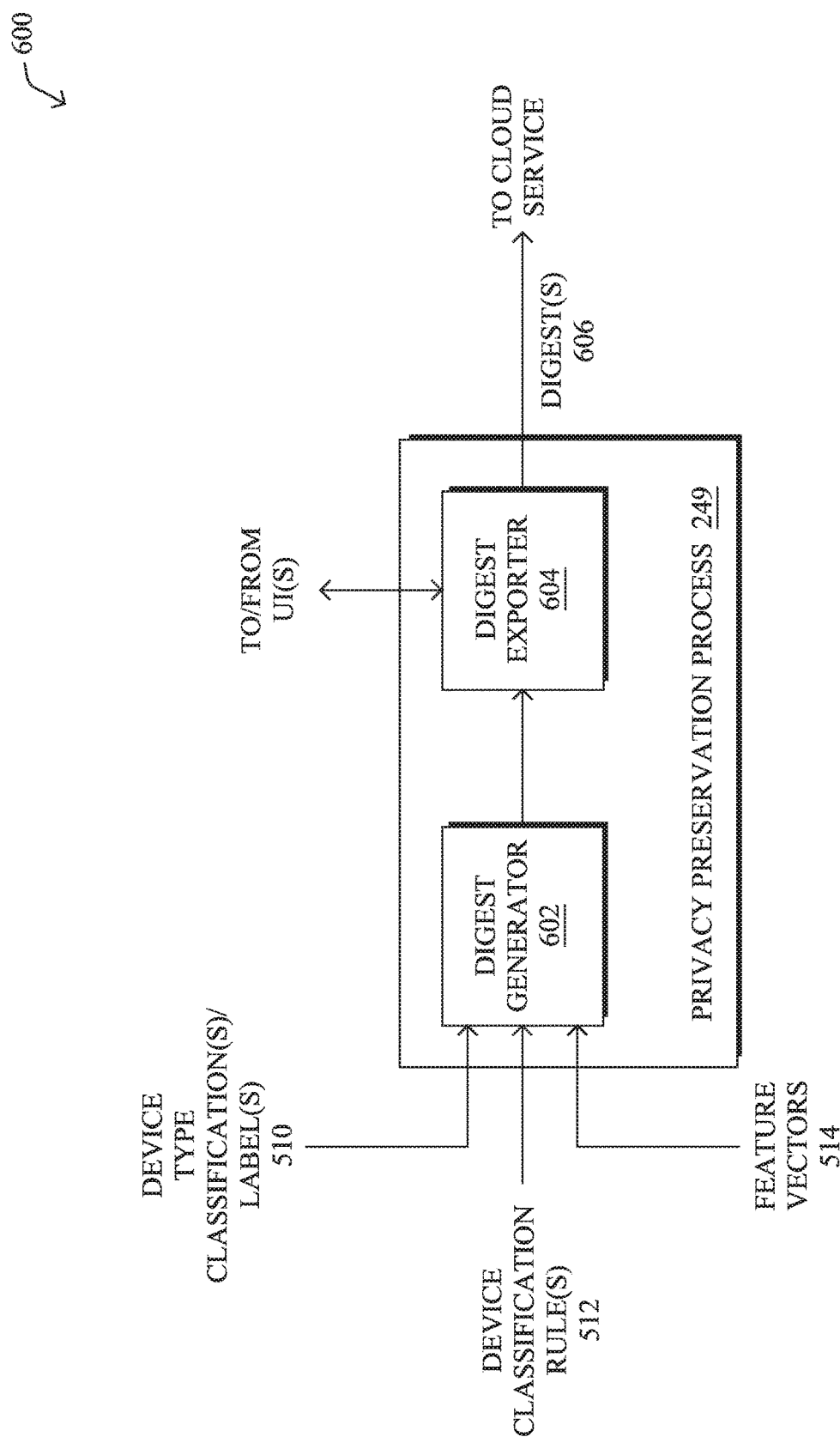
FIG. 6 illustrates an example architecture for a privacy preservation process.

Operationally, FIG. 6 illustrates an example architecture 600 for privacy preservation process 249, according to various embodiments. In general, privacy preservation process 249 may operate in conjunction with device classification process 248, such as part of an on-premise device classification service (e.g., service 408). As shown, process 249 may comprise a digest generator 602 and/or a digest exporter 604. These components 602-604 may be implemented in a centralized or distributed manner and their functionalities may be combined or omitted, as desired. In addition, some or all of components 602-604 may be implemented as part of device classification process 248, in further embodiments.

As shown, digest generator 602 of privacy preservation process 249 may obtain device type classification(s)/label(s) 510, device classification rule(s) 512, and feature vector examples 514 used to generate rule(s) 512, from device classification process 248. In general, a label 510 may indicate the device manufacturer, a device model, device version (e.g., software and/or hardware version), or other information that can be used to categorize devices/clients in a network. Similarly, device classification rule(s) 512 may specify the characteristics of network traffic or other telemetry regarding the device that can be used to label a particular device in the network as being of a certain type classification/label 510, if it exhibits those characteristics. Finally, digest generator 602 may also receive feature vectors 514 from device classification process 248 that include both positive and negative examples of characteristics used to generate a rule 512. For example, each dimension of a feature vector 514 may indicate the presence of a certain characteristic (e.g., the use of a certain protocol, etc.), either as a discrete value (e.g., '1' if a certain protocol was used and '0' if not) or as a categorical value. Note also that the set of feature vectors 514 is expected to be quite large, under normal circumstances.

During operation, digest generator 602 is responsible for taking label(s) 510, rules 512, and feature vectors 514, to produce digest(s) 606. Generally, digest(s) 606 are condensed summaries that can be used to do additional machine learning training, while still satisfying the privacy requirements of the on-premise network in which label(s) 510, rule(s) 512, and feature vector(s) 514 were generated.

As a first step, digest generator 602 may perform near-duplicate elimination on feature vectors 514, in some embodiments. This step entails digest generator 602 replacing similar feature vectors within the set of received feature vectors 514 used to produce a given rule 512 by a single feature vector. For example, digest generator 602 may assess a distance metric between two vectors 514, to determine whether they are 'near duplicates' of one another (e.g., whether their distances are below a threshold), using k-dimensional (kd) trees, density-based clustering with iterative neighborhood queries, or the like. As a result, the single feature vector may be an average, cluster medoid, or other representation of the vectors deemed similar by digest generator 602.

In one embodiment, digest generator 602 may also assign a weighting to the single feature vector based on the number of similar vectors that it replaced. Elimination of near-duplicates is important to reduce the size of the data to be sent to the cloud service, and does not hurt rule generation too much, as almost all supervised classification algorithms can run on weighted datasets.

Digest generator 602 can also use additional techniques to reduce the set of feature vectors 514. For instance, if large-margin techniques are used to train the rule 512 on premise, dataset generator 602 may discard feature vectors 514 with a high margin (i.e., far from the decision boundary), to further compress the dataset. Additional techniques such as coresets can also be used.

In a second step, digest generator 602 may apply a differential privacy mechanism to the reduced set of feature vectors. In general, differential privacy entails modifying data in a way that anonymizes its source. Said differently, differential privacy mechanisms are often simplified as a way to perturbate the data (e.g., by inserting noise), so as to provide 'plausible deniability' with respect any output feature vector having been observed in that exact way. The nature of this mechanism can vary, depending on whether the features are discrete or categorical. The nature of the mechanism can also vary on how the data is used for training in the cloud. In the case of categorical features, for example, digest generator 602 can apply the discrete exponential mechanism to the set of feature vectors. Indeed, the data in feature vectors 514 is often categorical, e.g., observed values for customer data platforms (CDPs), user agent values, open ports from active NMAP probes, DHCP attributes, etc.

Note that the differential privacy functions of digest generator 602 may be optional, in some cases. For example, some network administrators not concerned about privacy may simply skip the performance of this step. Overall, differential privacy with complex systems is a difficult task and can result in significant constraints (e.g., amount of perturbation required to guarantee a certain level of privacy may be unrealistic, in some cases). In a further embodiment, digest generator 602 may also perturbate any weights associated with the reduced set of feature vectors, to provide privacy with respect to the number of devices with certain types of characteristics.

The finalized digest 606 from digest generator 602 may generally comprise the label 510, classification rule 512, and processed set of feature vectors from digest generator 602.

As shown, privacy preservation process 249 may also include digest exporter 604, which is responsible for exporting the resulting digest(s) 606 for consumption by the cloud service. This can be achieved, in some cases, by sending digest(s) 606 directly to the cloud service. In the case of the local network being air-gapped, however, the final delivery of digest(s) 606 may require conveyance via a physical medium (e.g., an administrator downloads digests 606 to a disk, flash drive, etc., for upload to the service).

In some cases, digest exporter 604 may operate in conjunction with a user interface (U/I), to seek confirmation of a user before exporting a digest 606. For example, the user may be able to mark a given label as sensitive or review which labels should be shared. In turn, digest exporter 604 may prevent any corresponding digest 606 with such a label from being exported and sent to the cloud service. This may be important if the on-premise network includes devices/clients that are sensitive in nature and the administrator does not want to even reveal their names, publicly. In another embodiment, a subset of labels may be set according to the degree of sensitivity for such label (e.g., the user may consider some devices to be too sensitive, he/she may not want other to benefit from those values to others, etc.), or even its confidence when labelling those devices.

Figure 7:
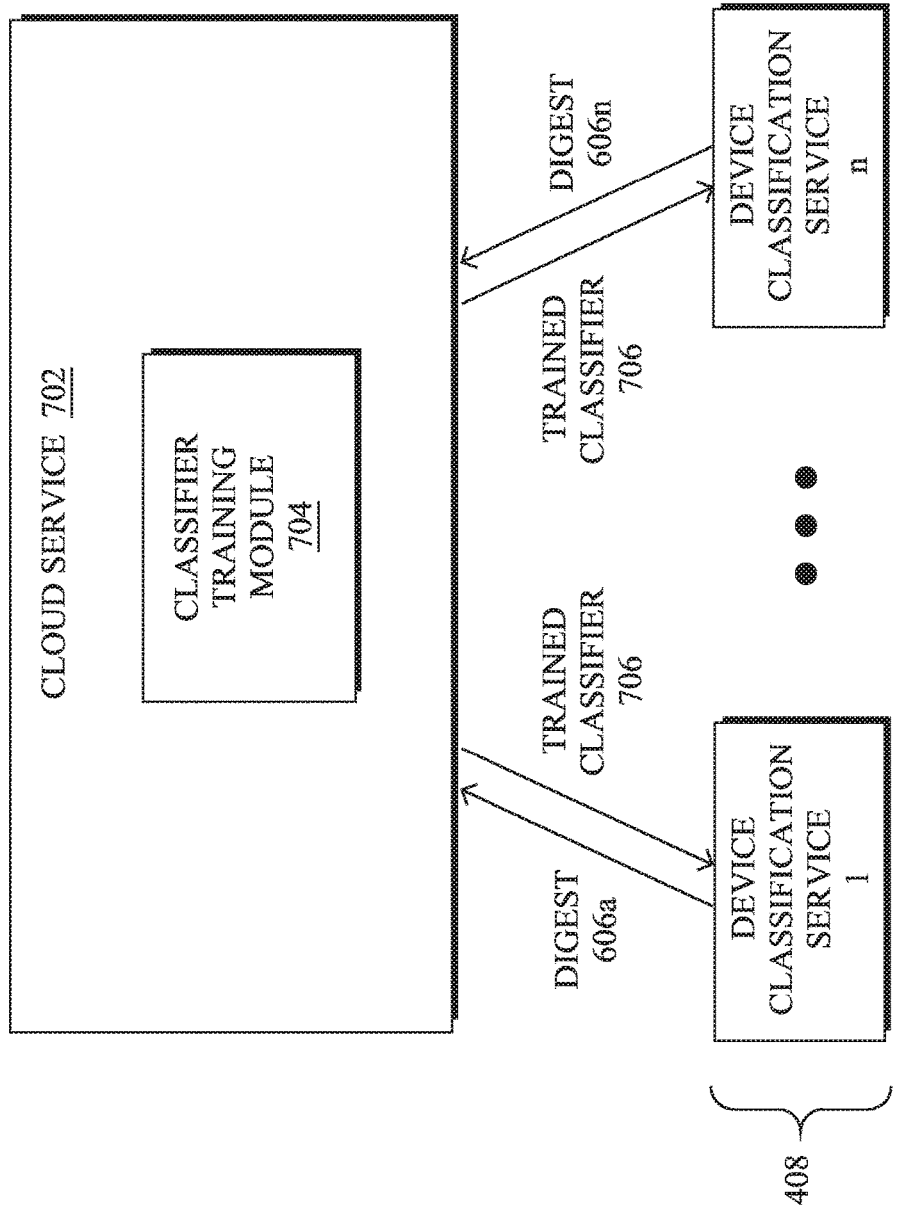
FIG. 7 illustrates an example architecture for training a machine learning-based device classifier.

Referring now to FIG. 7, an example architecture 700 is shown for training a machine learning-based device classifier, according to various embodiments. As shown, assume that there are any number of device classification services 408 across any number of on-premise networks, some of which may even be air-gapped. Such services 408, as noted, may be implemented through execution of device classification process 248 and/or privacy preservation process 249. Accordingly, each service 408 may export its corresponding digest(s) 606 and send them to cloud service 702 for consumption, either directly (e.g., via the Internet) or indirectly (e.g., via transferal first to a medium, in the case of an air-gapped network).

According to various embodiments, cloud service 702 may include a classifier training module 704 that is configured to train a multi-class classifier to classify devices/clients by their type, according to their behavioral characteristics. More specifically, classifier training module 704 may use a mixture of full data and the anonymized digests 606 from device classification services 408, to train a classifier 706. This may require a specific loss when mixing feature vector information from digests 606 with full feature information, as the information in the digests 606 may have been compressed and/or made private, as described above. Most machine learning models are amenable to this type of formulation, if they support weighted samples (and general reduction techniques exist to approximate that for any method through duplication).

Once trained, service 702 may deploy the trained classifier 706 to any or all of device classification services 408 for use in their respective networks. Again, in the case of air-gapped networks, this may entail the physical conveyance of the trained classifier 706 to a particular service 408 (e.g., by downloading the classifier 706 to disk and physically transporting it to a node of the air-gapped network, etc.). Once deployed, a device classification service 408 can use the trained classifier 706 to label/classify clients in its local network. As would be appreciated, by training classifier 706 using digests 606 from any number of networks, the resulting classifier 706 may exhibit better performance than one trained locally and also be more robust.

Figure 8:
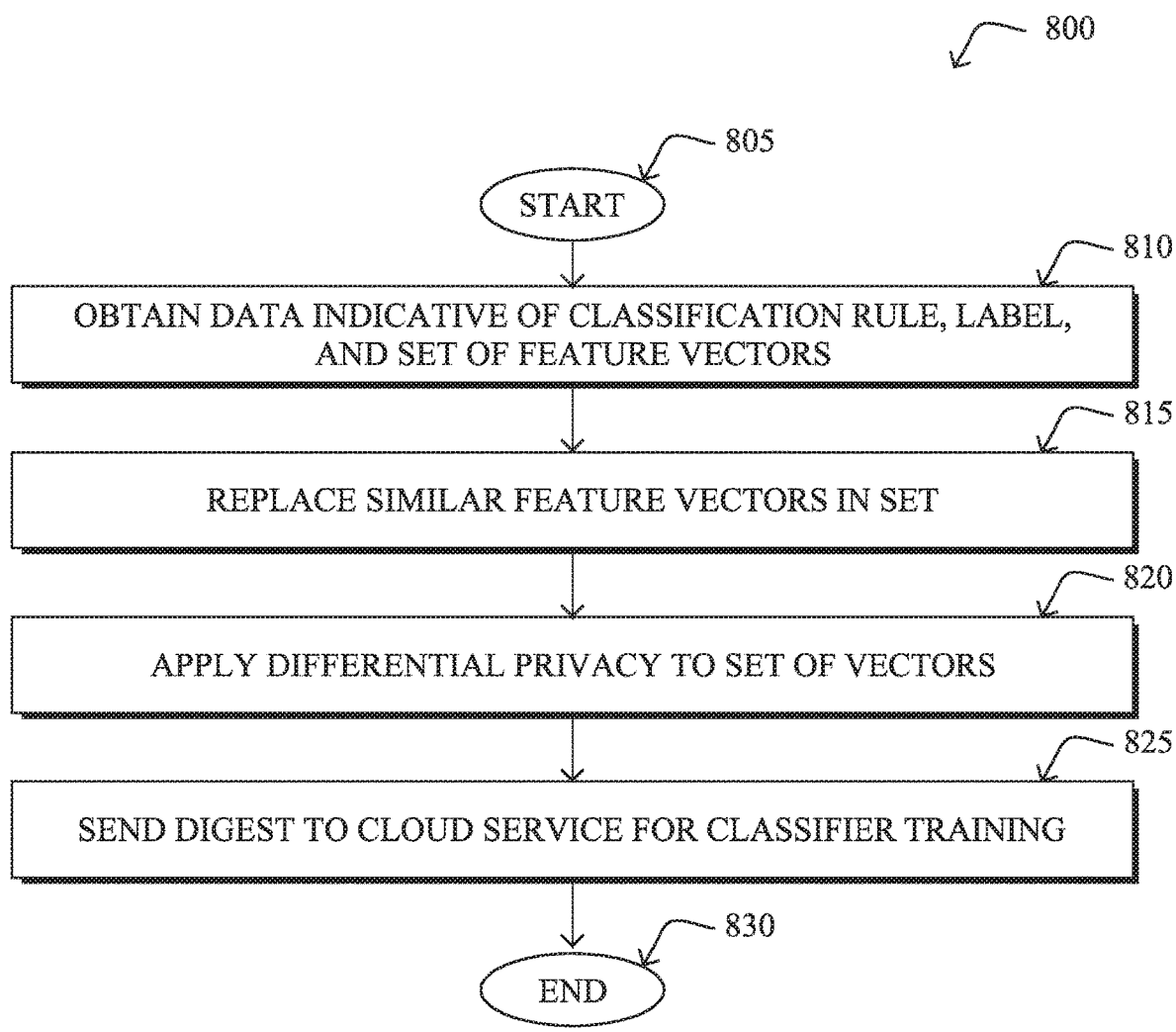
FIG. 8 illustrates an example simplified procedure for preserving privacy in exporting device classification rules.

FIG. 8 illustrates an example simplified procedure for preserving privacy in exporting device classification rules., in accordance with one or more embodiments described herein. For example, a non-generic, specifically configured device (e.g., device 200) may perform procedure 800 by executing stored instructions (e.g., process 249). The procedure 800 may start at step 805, and continues to step 810, where, as described in greater detail above, the device may obtain data indicative of a device classification rule, a device type label associated with the rule, and a set of positive and negative feature vectors used to create the rule. For example, the label may be indicative of one or more of: a device manufacturer, a device model, device version, or the like, and its corresponding rule may define the behavioral (e.g., traffic) characteristics associated with that label. Similarly, the positive and negative feature vectors may be based on the observed characteristics of devices/clients of the type indicated by the label or not, respectively, and used to generate the classification rule. For example, in some cases, active learning can be leveraged by asking an expert to label the feature vectors, accordingly, for purposes of learning the classification rule.

At step 815, as detailed above, the device may replace similar feature vectors in the set of positive and negative feature vectors with a single feature vector, to form a reduced set of feature vectors. In various embodiments, the device may do so by comparing the distances between the vectors. If their distances are below a defined threshold, the device may determine that they are similar (e.g., duplicates or near-duplicates), and replace them with a single vector representative of them (e.g., an average, etc.). In one embodiment, the device may also assign a weight to this new vector based on the number of similar vectors replaced by the vector in the set.

At step 820, the device may apply differential privacy to the reduced set of feature vectors, as described in greater detail above. In one embodiment, if the reduced set of feature vectors are categorical in nature (e.g., indicative of user agent values, open ports from active NMAP probes, DHCP attributes, etc.), the device may do so by applying a discrete exponential mechanism. In other embodiments, the device may do so using any suitable differential privacy mechanism, to obfuscate the actual sources of the vectors. In other words, the device may insert noise or otherwise adjust the vectors in a way that makes it difficult or impossible to determine which device or client is associated with a particular vector in the set.

At step 825, as detailed above, the device may send a digest to a cloud service. In various embodiments, the digest may comprise the device classification rule, the device type label, and the reduced set of feature vectors to which differential privacy was applied. In cases in which the device is connected to the Internet or another suitable network, it may send the digest to the cloud service directly. In other cases, such as when the device is in an air-gapped network, it may send the digest indirectly, such as by downloading the digest to a physical medium that a person can use to upload the digest to the cloud service. In turn, the cloud service may use the digest to train a machine learning-based device classifier. For example, the service may use the digests from any number of networks and/or device classification services, to train a multi-class classifier able to apply a device type label to a device, based on its observed behavioral characteristics. Procedure 800 then ends at step 830.

It should be noted that while certain steps within procedure 800 may be optional as described above, the steps shown in FIG. 8 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, allow the training and cross-validation of device classification rules from any number of networks, while ensuring the privacy of the training data, as well as reducing the resource consumption by the training.

While there have been shown and described illustrative embodiments that provide for preserving privacy in exporting device classification rules, it is to be understood that various other adaptations and modifications may be made within the spirit and scope of the embodiments herein. For example, while certain embodiments are described herein with respect to using certain models for purposes of device type classification, the models are not limited as such and may be used for other functions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
obtaining, by a device in a network, data indicative of a device classification rule, a device type label associated with the rule, and a set of positive and negative feature vectors used to create the rule;
replacing, by the device, similar feature vectors in the set of positive and negative feature vectors with a single feature vector, to form a reduced set of feature vectors;
applying, by the device, differential privacy to the reduced set of feature vectors; and
sending, by the device, a digest to a cloud service,
wherein the digest comprises the device classification rule, the device type label, and the reduced set of feature vectors to which differential privacy was applied, and
wherein the cloud service uses the digest to train a machine learning-based device classifier.

2. The method as in claim 1, further comprising:
receiving, at the device, the trained machine learning classifier; and
using the trained machine learning classifier to classify a client in the network.

3. The method as in claim 1, wherein the positive feature vectors are indicative of characteristics of network traffic associated with clients in the network to which the device type label was applied, and wherein the negative feature vectors are indicative of characteristics of network traffic associated with clients in the network to which the device type label was not applied.

4. The method as in claim 1, wherein the device type label was applied to the positive feature vectors via active learning.

5. The method as in claim 1, further comprising:
receiving, at the device and from a user interface, an indication that a particular device type label is sensitive; and
preventing, by the device, a digest that includes the particular device type label from being sent to the cloud service.

6. The method as in claim 1, wherein applying differential privacy to the reduced set of feature vectors comprises:
applying a discrete exponential mechanism to the reduced set of feature vectors, to change values in the feature vectors.

7. The method as in claim 1, wherein the device type label is indicative of one or more of: a device manufacturer, a device model, or device version.

8. The method as in claim 1, wherein replacing similar feature vectors in the set of positive and negative feature vectors with a single feature vector, to form a reduced set of feature vectors, comprises:
assigning a weight to the single feature vector based on a number of the similar feature vectors in the set.

9. The method as in claim 8, wherein applying differential privacy to the reduced set of feature vectors further comprises:
adjusting the weight assigned to the single feature vector.

10. An apparatus, comprising:
one or more network interfaces to communicate with one or more networks;
a processor coupled to the network interfaces and configured to execute one or more processes; and
a memory configured to store a process executable by the processor, the process when executed configured to:
obtain data indicative of a device classification rule, a device type label associated with the rule, and a set of positive and negative feature vectors used to create the rule;
replace similar feature vectors in the set of positive and negative feature vectors with a single feature vector, to form a reduced set of feature vectors;
apply differential privacy to the reduced set of feature vectors; and
send a digest to a cloud service,
wherein the digest comprises the device classification rule, the device type label, and the reduced set of feature vectors to which differential privacy was applied, and
wherein the cloud service uses the digest to train a machine learning-based device classifier.

11. The apparatus as in claim 10, wherein the process when executed is further configured to:
receive the trained machine learning classifier; and
use the trained machine learning classifier to classify a client in the network.

12. The apparatus as in claim 10, wherein the positive feature vectors are indicative of characteristics of network traffic associated with clients in the network to which the device type label was applied, and wherein the negative feature vectors are indicative of characteristics of network traffic associated with clients in the network to which the device type label was not applied.

13. The apparatus as in claim 10, wherein the device type label was applied to the positive feature vectors via active learning.

14. The apparatus as in claim 10, wherein the process when executed is further configured to:
receive, from a user interface, an indication that a particular device type label is sensitive; and
prevent a digest that includes the particular device type label from being sent to the cloud service.

15. The apparatus as in claim 10, wherein the apparatus applies differential privacy to the reduced set of feature vectors by:
applying a discrete exponential mechanism to the reduced set of feature vectors, to change values in the feature vectors.

16. The apparatus as in claim 10, wherein the device type label is indicative of one or more of: a device manufacturer, a device model, or device version.

17. The apparatus as in claim 10, wherein the apparatus replaces similar feature vectors in the set of positive and negative feature vectors with a single feature vector, to form a reduced set of feature vectors, by:
assigning a weight to the single feature vector based on a number of the similar feature vectors in the set.

18. The apparatus as in claim 17, wherein the apparatus applies differential privacy to the reduced set of feature vectors further by:
adjusting the weight assigned to the single feature vector.

19. A tangible, non-transitory, computer-readable medium storing program instructions that cause a device to execute a process comprising:
obtaining, by a device in a network, data indicative of a device classification rule, a device type label associated with the rule, and a set of positive and negative feature vectors used to create the rule;
replacing, by the device, similar feature vectors in the set of positive and negative feature vectors with a single feature vector, to form a reduced set of feature vectors;

applying, by the device, differential privacy to the reduced set of feature vectors; and sending, by the device, a digest to a cloud service,
- wherein the digest comprises the device classification rule, the device type label, and the reduced set of feature vectors to which differential privacy was applied, and
- wherein the cloud service uses the digest to train a machine learning-based device classifier.

20. The computer-readable medium as in claim 19, wherein the device type labels are indicative of one or more of: a device manufacturer, a device model, or device version.

\* \* \* \* \*